March 5, 1957 J. S. FALZONE 2,784,069
FUEL MIXING MEANS
Filed April 30, 1954

INVENTOR.
JOSEPH S. FALZONE

2,784,069

FUEL MIXING MEANS

Joseph S. Falzone, Bethpage, N. Y.

Application April 30, 1954, Serial No. 426,663

1 Claim. (Cl. 48—180)

This invention relates to fuel mixing means and more particularly to such means incorporating turbine members for agitating and mixing the fuel and air output from a carburetor.

It is well known that the efficiency of internal combustion engines is quite low. One of the factors in this low efficiency is the lack of the maximum possible distribution of the fuel and air mixture so as to insure an optimum mixture for combustion. The output of a carburetor is a mixture of air and droplets of fuel and this mixture in conventional engines is fed to the intake manifold whence it is supplied to the various cylinders.

The present invention provides mixing means connected between the carburetor and the intake manifold to provide a better mixing and distribution of the air and fuel.

More particularly, the invention comprises a cylindrical fuel passage connected to the output of a carburetor, a first stator member having radial vanes, a pair of rotary turbine wheels and a second stator member. The action of the vanes of tthe first stator changes the direction of flow. The turbine wheels are turned at high speed by the flow of fuel caused by the engine vacuum, thereby causing tremendous agitation and collision of the fuel particles and dispersing the fuel in finer particles and providing a more uniform distribution of the fuel and air thereby providing a more combustible mixture.

Accordingly, a principal object of the present invention provides new and improved means for increasing the efficiency of internal combustion engines.

Another object of the present invention is to provide new and improved means for increasing the efficiency of fuel combustion.

Another object of the present invention is to provide new and improved fuel mixing means.

Another object of the present invention is to provide new and improved fuel mixing means comprising a plurality of turbine wheels.

Another object of the present invention is to provide new and improved fuel mixing means comprising a plurality of turbine wheels cooperating with stationary means for changing the direction of flow.

These and other objects of the present invention will be apparent from the following specifications of which:

Figure 1:
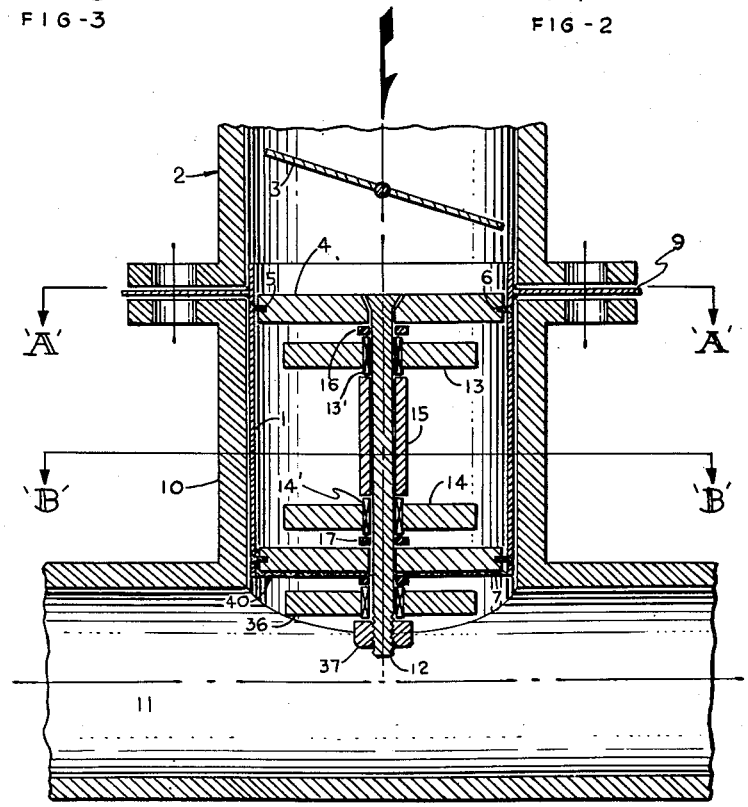
Figure 1 is an elevation sectional view of a embodiment of the invention.

Referring to Figure 1, the present invention comprises a cylindrical member 1 which is adapted to be connected to the output conduit or pipe 2 of a carburetor by flange 9. A butterfly valve 3 is shown in the carburetor output pipe 2. A first stator member 4 is mounted inside the cylindrical member 1 by means of screws or pins 5 and 6, and a second stator member 7 is shown mounted at the bottom of the cylindrical member 1 in similar fashion. The cylindrical member 1 is inserted in a connecting pipe 10 which is connected to the intake manifold 11.

A center axle 12 is mounted in the two stator members. A pair of rotary turbine wheels 13 and 14, are mounted on the axle 12 by means of ball bearings 13' and 14'. The rotary turbine wheels are spaced apart by the spacer 15 and they are spaced from the stator members by spacers 16 and 17.

Figure 3:
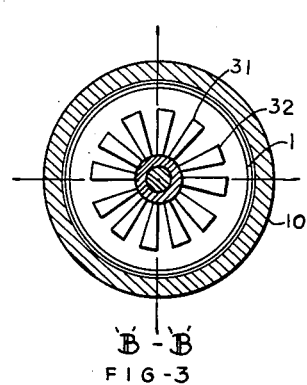
Figure 3 is a plan sectional view of Figure 1 taken along the line B—B.
Figure 2:
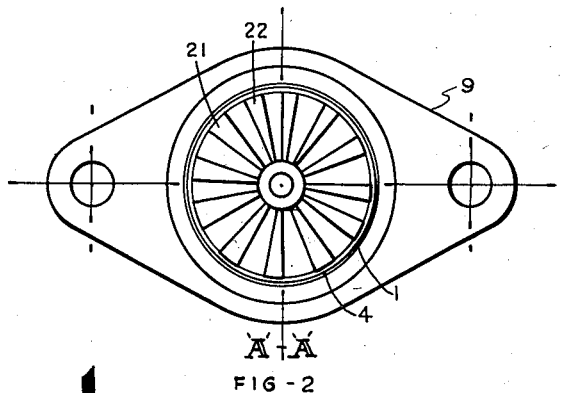
Figure 2 is a plan sectional view of the embodiment of Figure 1, taken along the line A—A.

The stator members 4 and 7 contain a plurality of radial vanes 21, 22, etc. Fig. 2, which, in one embodiment of the invention are inclined at an angle of approximately 10° to the axle 12. The rotary turbine wheels 13 and 14 have a plurality of radial vanes 31, 32, Fig. 3, which are inclined in one embodiment of the invention at an angle of approximately 20° to the axle 12. The stator vanes are inclined in one director and the rotor vanes in the other.

The rotor blades are straight in the radial direction but preferably have a curved cross section. The angle of pitch of the rotor blades should preferably be from 20° to 45°.

A third rotor 36 is mounted on the bottom of axle 12 by nut 37 and the entire assembly held by a cotter pin or key.

Rotor 36 extends into the manifold 11 and serves several purposes. It accelerates the mixture through the manifold, minimizes eddy current effects around the sharp corners and therefore, avoids any back pressure. It also avoids any possibility of flashback through the mixing device.

A screen 40 may be inserted across the full passage to help filter and strain larger particles of fuel out and break them up.

The fuel flows from the carburetor down through the mixing apparatus of the present invention as shown by the arrow. As the fuel flows through the first stator 4, its direction of travel will be deflected by the vanes of the stator 4. The flow of fuel will cause the turbine wheels 13 and 14 to rotate rapidly thereby greatly agitating the fuel mixture and causing the collision of the suspended fuel particles so that the fuel particles are broken up into very fine portions and for all practical purposes may be said to be atomized. The rotary turbine wheels 13 and 14 will operate at a fairly high speed depending of course, upon the rate of flow which in turn, depends upon the vacuum pressure developed at the intake manifold. The entire purpose of the mixing device is to create a tremendous amount of agitation and turbulence in the fuel mixture, which has already been mixed by a conventional carburetor. The collision will cause an increase in temperature and therefore, provide greater thermal efficiency. This agitation and turbulence will greatly enhance the distribution and dispersement of the fuel with the oxygen and will thereby provide a mixture which will be more combustible than that provided by the carburetor alone.

The components are preferably made of non-corrosive material such as stainless steel or aluminum or brass.

Thus, it is seen that the present invention provides a plurality of stator and rotor wheels which are formed like turbine wheels with radial inclined vanes. The vanes of the stators and rotors have reverse pitch. Therefore, the fuel flow will cause the rotors to rotate at very high speed and create a tremendous agitation in the mixing device which will atomize the fuel particles and provide an optimum combustible mixture.

The mixing device of the present invention may be referred to as a collision nozzle since it is the collision of the particles of fuel which break down into very fine particles.

An operating object of this nozzle is to converge the fuel and air particles, for continuous positive colliding action, to prevent disassociation of the air fuel particles which ionized form negative particles which decrease positive action, create a low potential, and slow movement of the particles, which decreases their collision for rapid expansion and velocity.

The following advantages will be apparent:

1. The air fuel mixture collides continously to insure the maximum thermal value of the fuel, with increase of efficiency.

2. The fuel is completely burned, and will show greater economy on a gallon basis.

3. Decreases the amount of positive products remaining in the combustion chamber, after combustion due to partial disassociation of the combustion products.

4. Aids valves from becoming warped and pitted, due to water vapor that is not condensed, due to negative particles of low thermal values.

The gases emerge thru the final directional stationary stator which directs the gases through the manifold and then to the combustion chambers, with positive colliding action and expanding particles, with high thermal values, making available a greater amount of energy and efficiency for greater economy on a gallon basis of fuel utilized.

This device may be installed on automotive carburetors, a single nozzle mixer being inserted into barrel at base of carburetor. A two unit nozzle will be used for two barrel carburetors and a four unit nozzle for four barrel carburetors.

In household heating plants that use fuel oil for heating, a nozzle mixer may be attached to barrel of oil gun, in front of spray nozzle. The present mixer nozzle will prevent large particles from entering combustion chamber. The disadvantages of large particles is that only the surface of the particles are burned, and the center converted into sludge substance which is deposited on the combustion chamber walls, with a decrease in B. t. u., and an increase in fuel consumption.

The physical dimensions of this device will vary with the size, make or type of carburetor or barrel of oil burner to which it is to be affixed.

The embodiment of the invention has been shown with two stators and two rotors. However, it is not limited since any greater number of stators and rotors may be used for the mixing action. The combination shown has been found both efficient and practical for automotive vehicles. However, in special applications other combinations could be used. Naturally, the more mixing components the finer the mixture will be. The maximum number of mixing components will be determined in a particular case by space limitations.

I claim:

Fuel mixing means comprising a fuel conduit in a fuel intake system adapted to be connected to the output of a carburetor, a first stator member mounted in said conduit having radial vanes inclined to the axis of said fuel conduit, a first rotor member rotatably mounted in said fuel conduit below said first stator means, a second rotor member rotatably mounted in said conduit below said first rotor member, said rotor members having radial vanes inclined with respect to the direction of said conduit, a second stator member mounted in said conduit below said second rotor member, an intake manifold connected to said conduit below said second stator, and means to avoid back pressure, comprising a third rotor mounted below said second stator inside said intake manifold.

References Cited in the file of this patent

UNITED STATES PATENTS

| | | |
|---|---|---|
| 574,183 | Underwood | Dec. 29, 1896 |
| 942,503 | Jacobs | Dec. 7, 1909 |
| 1,386,297 | Wilsey | Aug. 2, 1921 |
| 1,421,530 | Moore | July 4, 1922 |
| 1,450,550 | Hudson | Apr. 3, 1923 |
| 1,874,894 | Carlberg | Aug. 30, 1932 |
| 2,018,561 | Lucich | Oct. 22, 1935 |
| 2,238,565 | Morton | Apr. 15, 1941 |
| 2,374,517 | Wilson | Apr. 24, 1945 |
| 2,415,668 | Barabino | Feb. 11, 1947 |

FOREIGN PATENTS

| | | |
|---|---|---|
| 885,026 | Germany | July 30, 1953 |
| 359,062 | Great Britain | Oct. 22, 1931 |